US010785160B2

(12) United States Patent
Tang et al.

(10) Patent No.: US 10,785,160 B2
(45) Date of Patent: Sep. 22, 2020

(54) CONGESTION CONTROL METHOD AND APPARATUS

(71) Applicant: HUAWEI TECHNOLOGIES CO., LTD., Shenzhen, Guangdong (CN)

(72) Inventors: Cheng Tang, Beijing (CN); Zuqing Li, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 49 days.

(21) Appl. No.: 16/052,533

(22) Filed: Aug. 1, 2018

(65) Prior Publication Data
US 2018/0367462 A1 Dec. 20, 2018

Related U.S. Application Data

(63) Continuation of application No. PCT/CN2017/073219, filed on Feb. 10, 2017.

(30) Foreign Application Priority Data

Jun. 29, 2016 (CN) .......................... 2016 1 0506424

(51) Int. Cl.
*H04L 12/825* (2013.01)
*H04L 12/807* (2013.01)
(Continued)

(52) U.S. Cl.
CPC ............ *H04L 47/25* (2013.01); *H04L 47/115* (2013.01); *H04L 47/27* (2013.01); *H04L 45/48* (2013.01)

(58) Field of Classification Search
CPC ....... H04L 45/48; H04L 47/115; H04L 47/25; H04L 47/27
See application file for complete search history.

(56) References Cited

U.S. PATENT DOCUMENTS 5,497,375 A * 3/1996 Hluchyj .............. H04L 12/5602
  370/232
6,480,502 B1 * 11/2002 Abadi ..................... H04L 45/00
  370/254

(Continued)

FOREIGN PATENT DOCUMENTS

CN      101099354 A     1/2008
CN      101431465 A     5/2009
(Continued)

OTHER PUBLICATIONS

Itu-T G.8013/Y.1731. Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Operation, administration and maintenance. Operation, administration and maintenance (OAM) functions and mechanisms for Ethernet-based networks. Aug. 2015, 102 pages.

*Primary Examiner* — Steven H Nguyen
(74) *Attorney, Agent, or Firm* — Womble Bond Dickinson (US) LLP

(57) ABSTRACT

The present application discloses a congestion control method and an apparatus. The method includes: receiving, by a root node network element, a first link notification message; determining, based on the link status information of the first link, that the first link is congested; determining an identifier of a first leaf node network element based on a correspondence between an identifier of the first port and the identifier of the first leaf node network element; determining a service queue of the first leaf node network element based on a correspondence between the identifier of the first leaf node network element and an identifier of the service queue of the first leaf node network element; and lowering output (Continued)

bandwidth of the service queue of the first leaf node network element.

14 Claims, 10 Drawing Sheets

(51) Int. Cl.
  *H04L 12/801* (2013.01)
  *H04L 12/753* (2013.01)

(56) References Cited

U.S. PATENT DOCUMENTS

| | | | | |
|---|---|---|---|---|
| 7,675,857 | B1* | 3/2010 | Chesson | H04L 47/10 370/235 |
| 2006/0056308 | A1* | 3/2006 | Gusat | H04L 45/00 370/252 |
| 2006/0187829 | A1 | 8/2006 | Heiner et al. | |
| 2008/0037552 | A1 | 2/2008 | Dos Remedios et al. | |
| 2008/0225737 | A1* | 9/2008 | Gong | H04L 47/824 370/252 |
| 2009/0232001 | A1* | 9/2009 | Gong | H04L 47/10 370/236 |
| 2009/0274047 | A1* | 11/2009 | Kruys | H04L 47/11 370/236 |
| 2012/0051216 | A1* | 3/2012 | Zhang | H04L 47/12 370/230 |
| 2012/0092995 | A1* | 4/2012 | Arvidsson | H04L 47/10 370/235 |
| 2012/0155262 | A1* | 6/2012 | Li | H04L 41/0816 370/231 |
| 2014/0119192 | A1* | 5/2014 | Koshimizu | H04W 28/0231 370/236 |
| 2014/0185452 | A1* | 7/2014 | Kakadia | H04W 28/12 370/236 |
| 2014/0198643 | A1* | 7/2014 | Conway | H04W 24/08 370/230 |
| 2014/0254381 | A1* | 9/2014 | Racz | H04L 47/14 370/235 |
| 2017/0338976 | A1* | 11/2017 | Wang | H04L 49/3009 |

FOREIGN PATENT DOCUMENTS

| | | |
|---|---|---|
| CN | 101631068 A | 1/2010 |
| CN | 101754266 A | 6/2010 |
| CN | 103338481 A | 10/2013 |
| CN | 104883710 A | 9/2015 |
| EP | 2192731 A1 | 6/2010 |

* cited by examiner

US 10,785,160 B2

CONGESTION CONTROL METHOD AND APPARATUS

CROSS-REFERENCE TO RELATED APPLICATIONS

This application is a continuation of International Application No. PCT/CN2017/073219, filed on Feb. 10, 2017, which claims priority to Chinese Patent Application No. 201610506424.4, filed on Jun. 29, 2016. The disclosures of the aforementioned applications are hereby incorporated by reference in their entireties.

TECHNICAL FIELD

The present application relates to the field of communications technologies, and in particular, to a congestion control method and an apparatus.

BACKGROUND

A current congestion control method is specific to a chain topology network. In the network, a root node network element transmits traffic to one or more leaf node network elements by using one or more intermediate node network elements. Each intermediate node network element is directly connected to one intermediate node network element or one leaf node network element, as shown in FIG. 1. That two network elements are directly connected means that the two network elements are connected by using a link, and no other network element is included on the link. FIG. 1 shows an example in which a root node network element transmits traffic to a leaf node network element by using intermediate node network elements 1, 2, and 3 successively.

The congestion control method based on the chain topology network is as follows: An intermediate node network element monitors available bandwidth of a link that is directly connected to the intermediate node network element and that is configured to transmit traffic to a leaf node network element, and reports the available bandwidth to a root node network element. The root node network element determines, based on the available bandwidth reported by the intermediate node network element, whether the link is a congested link. If the link is congested, the root node network element uses a minimum value of available bandwidth of links between every two neighboring network elements on an entire link, including the link, from the root node network element to the leaf node network element as a value of output bandwidth of a port that is of the root node network element and that is directly connected to the entire chain. For example, in FIG. 1, after determining that a link 2 is congested, the root node network element uses a minimum value of available bandwidth B0 of a link 0, available bandwidth B1 of a link 1, available bandwidth B2 of the link 2, and available bandwidth B3 of a link 3 on an entire link B including the link 2 as a value of output bandwidth of a port 0 of the root node network element.

However, the foregoing method cannot resolve a congestion problem in a tree topology network. In the tree topology network, an intermediate node network element is allowed to directly connect to two or more intermediate node network elements, as shown in FIG. 2. In FIG. 2, an intermediate node network element 2 is directly connected to an intermediate node network element 3 through a port 1, and directly connected to an intermediate node network element 4 through a port 2. In the tree topology network, if some of a plurality of links connected directly to an intermediate node network element are congested, congestion control based on the foregoing method may reduce available bandwidth of another uncongested link connected directly to the intermediate node network element, thereby affecting a throughput of the entire network. For example, in FIG. 2, if a link 2 is congested, congestion control based on the foregoing method may reduce output bandwidth of a port 0 of a root node network element, and result in relatively small output bandwidth of the port 2 of the intermediate node network element 2. Available bandwidth of an uncongested link 4 is reduced. A throughput of the entire network is therefore affected.

SUMMARY

Embodiments of the present application provide a congestion control method and an apparatus, which are applied to a tree topology network, so as to alleviate congestion of a congested link without affecting bandwidth of another uncongested link, thereby optimizing a throughput of the entire network.

To achieve the foregoing objectives, the following technical solutions are used in the embodiments of the present application:

According to a first aspect, a congestion control method is provided, and is applied to a tree topology network, and the tree topology network includes a root node network element, a first intermediate node network element, and a first leaf node network element. The method may include: receiving, by the root node network element, a first link notification message sent by the first intermediate node network element; determining, based on link status information of a first link in the first link notification message, that the first link is congested; determining an identifier of the first leaf node network element based on a correspondence between an identifier of a first port and the identifier of the first leaf node network element; determining a service queue of the first leaf node network element based on a correspondence between the identifier of the first leaf node network element and an identifier of the service queue of the first leaf node network element; and lowering output bandwidth of the service queue of the first leaf node network element.

According to a second aspect, a root node network element is provided, and is applied to a tree topology network, and the tree topology network includes a root node network element, a first intermediate node network element, and a first leaf node network element. The root node network element includes a receiving unit, a determining unit, and an adjustment unit. The receiving unit is configured to receive a first link notification message sent by the first intermediate node network element. The determining unit is configured to: determine, based on link status information of a first link in the first link notification message, that the first link is congested; determine an identifier of the first leaf node network element based on a correspondence between an identifier of a first port and the identifier of the first leaf node network element; and determine a service queue of the first leaf node network element based on a correspondence between the identifier of the first leaf node network element and an identifier of the service queue of the first leaf node network element. The adjustment unit is configured to lower output bandwidth of the service queue of the first leaf node network element.

In the first aspect or the second aspect, the first link notification message carries the link status information of the first link that is directly connected to the first port of the first intermediate node network element and the identifier of the first port, the first link is used to transmit traffic from the first intermediate node network element to the first leaf node network element, and the service queue of the first leaf node network element is a service queue transmitted by the root node network element to the first leaf node network element.

In the foregoing technical solutions, it can be ensured that bandwidth of a congested link connected directly to the first intermediate node network element is controlled without affecting bandwidth of another uncongested link connected directly to the first intermediate node network element, so that a throughput of the entire network is optimized compared with the prior art.

In the first aspect or the second aspect, optionally, the link status information of the first link includes at least one piece of the following information: information that the first link is congested; information that a packet loss exists on the first link; information that a depth of a port queue of the first port is greater than or equal to a preset threshold, where the depth of the port queue refers to a difference between input traffic of the first port and output traffic of the first port; or a value of available bandwidth of the first link. Compared with the prior art, there are more types of link status information carried in a congestion notification message provided in the optional implementation.

In an implementation, the tree topology network may include a plurality of intermediate node network elements and a plurality of leaf node network elements. The plurality of intermediate node network elements include the first intermediate node network element, and the plurality of leaf node network elements include the first leaf node network element. In this case:

Optionally, based on any one of the first aspect or the implementations of the first aspect, before the determining, by the root node network element, an identifier of the first leaf node network element based on a correspondence between an identifier of a first port and the identifier of the first leaf node network element, the method may further include: generating, by the root node network element based on the tree topology, a correspondence table between an identifier of each port of one of the plurality of intermediate node network elements and an identifier of one of the plurality of leaf node network elements; and obtaining the correspondence between the identifier of the first port and the identifier of the first leaf node network element based on the correspondence table.

Correspondingly, based on any one of the second aspect or the implementations of the second aspect, the root node network element may further include a generation unit and an obtaining unit. The generation unit is configured to generate, based on the tree topology, a correspondence table between an identifier of each port of one of the plurality of intermediate node network elements and an identifier of one of the plurality of leaf node network elements. The obtaining unit is configured to obtain the correspondence between the identifier of the first port and the identifier of the first leaf node network element.

In an optional implementation, each port of the intermediate node network element is a port that is of the intermediate node network element and that is configured to transmit traffic to the leaf node network element. In the optional implementation, a correspondence between an identifier of each port of one of the plurality of intermediate node network elements and an identifier of one of the plurality of leaf node network elements is stored in the correspondence table. In an implementation, a software scheduler may be configured to schedule the correspondence in the correspondence table. Therefore, the optional implementation may be applicable to any complex tree topology network.

Optionally, based on any one of the first aspect or the implementations of the first aspect, the lowering, by the root node network element, output bandwidth of the service queue of the first leaf node network element may include: lowering, by the root node network element, the output bandwidth of the service queue of the first leaf node network element by a first preset step. In this case, the method may further include but is not limited to any one of the following implementations:

Implementation 1: If the root node network element re-determines, within a preset time period after lowering the output bandwidth of the service queue of the first leaf node network element, that the first link is congested, the root node network element continues to lower the output bandwidth of the service queue of the first leaf node network element by the first preset step.

Implementation 2: If the root node network element determines, within a preset time period after lowering the output bandwidth of the service queue of the first leaf node network element, that the first link is uncongested, the root node network element raises the output bandwidth of the service queue of the first leaf node network element by a second preset step, where the second preset step is less than the first preset step.

Correspondingly, based on any one of the second aspect or the implementations of the second aspect, the adjustment unit is configured to lower the output bandwidth of the service queue of the first leaf node network element by a first preset step. In this case:

Implementation 1: The determining unit is further configured to re-determine, within a preset time period after the adjustment unit lowers the output bandwidth of the service queue of the first leaf node network element, that the first link is congested. The adjustment unit is further configured to continue to lower the output bandwidth of the service queue of the first leaf node network element by the first preset step.

Implementation 2: The adjustment unit is configured to lower the output bandwidth of the service queue of the first leaf node network element by the first preset step. The determining unit is further configured to determine, within a preset time period after the adjustment unit lowers the output bandwidth of the service queue of the first leaf node network element, that the first link is uncongested. The adjustment unit is further configured to raise the output bandwidth of the service queue of the first leaf node network element by a second preset step, where the second preset step is less than the first preset step.

It should be noted that, in an implementation, the output bandwidth of the service queue of the first leaf node network element may be "raised" or "lowered" a plurality of times by using different preset thresholds, to ensure that congestion on the first link is eliminated and the network throughput is maximum. The optional implementation may be understood as follows: After a congestion alarm on the first link disappears (the first link is determined as uncongested), the root node network element slowly recovers bandwidth, and this is similar to slow recovery in TCP.

In an implementation, the tree topology network may further include a second intermediate node network element, and the first intermediate node network element is connected to the second intermediate node network element by using the first link. In this case:

Optionally, based on any one of the first aspect or the implementations of the first aspect, before the determining an identifier of the first leaf node network element based on a correspondence between an identifier of a first port and the identifier of the first leaf node network element, the method may further include: receiving, by the root node network element, a second link notification message sent by the second intermediate node network element; determining, based on link status information of a second link in the second link notification message, that the second link is congested; and determining that a hop count between the first intermediate node network element and the root node network element is less than a hop count between the second intermediate node network element and the root node network element.

For example, after the lowering, by the root node network element, output bandwidth of the service queue of the first leaf node network element, the method may further include: receiving, by the root node network element, a third link notification message sent by the second intermediate node network element; determining, based on link status information of the second link carried in the third link notification message, that the second link is congested; determining the identifier of the first leaf node network element based on a correspondence between an identifier of a second port and the identifier of the first leaf node network element; determining a service queue of the first leaf node network element based on a correspondence between an identifier of the first leaf node network element and an identifier of the service queue of the first leaf node network element; and lowering output bandwidth of the service queue of the first leaf node network element.

Correspondingly, based on any one of the second aspect or the implementations of the second aspect, optionally, the receiving unit is further configured to receive a second link notification message sent by the second intermediate node network element. The determining unit is further configured to: determine, based on link status information of a second link in the second link notification message, that the second link is congested, and determine that a hop count between the first intermediate node network element and the root node network element is less than a hop count between the second intermediate node network element and the root node network element.

For example, the receiving unit is further configured to receive a third link notification message sent by the second intermediate node network element. The determining unit is further configured to: determine, based on link status information of the second link carried in the third link notification message, that the second link is congested; determine the identifier of the first leaf node network element based on a correspondence between an identifier of a second port and the identifier of the first leaf node network element; and determine a service queue of the first leaf node network element based on a correspondence between an identifier of the first leaf node network element and an identifier of the service queue of the first leaf node network element. The adjustment unit is further configured to lower output bandwidth of the service queue of the first leaf node network element.

In the optional implementation, the second link notification message carries the link status information of the second link that is directly connected to the second port of the second intermediate node network element, the second link is configured to transmit traffic from the second intermediate node network element to the first leaf node network element, and the third link notification message carries the link status information of the second link and the identifier of the second port.

The optional implementation may be understood as follows: When the root node network element determines that a plurality of links connected directly to a plurality of intermediate node network elements are congested, and there is a communication relationship between the plurality of intermediate node network elements, the root node network element determines a congestion control order of the plurality of links based on an ascending order of hop counts between the plurality of intermediate node network elements and the root node network element. Therefore, congestion on the plurality of links can be fast alleviated.

According to a third aspect, a root node network element is provided, and the root node network element has a function of the congestion control method provided in the first aspect. The function may be implemented by using hardware, or may be implemented by hardware executing corresponding software. The hardware or software includes one or more modules corresponding to the foregoing function.

In a possible design, a structure of the root node network element includes a processor and a transceiver. The processor is configured to support the root node network element in performing the corresponding function in the foregoing method. The transmitter is configured to support communication between the root node network element and an intermediate node network element. The root node network element may further include a memory. The memory coupled to the processor is configured to store necessary program instructions and data that are required for performing the foregoing method by the root node network element.

According to a fourth aspect, a computer storage medium is provided, and is configured to store a computer software instruction used by the foregoing root node network element to perform the foregoing method. The computer storage medium includes a program designed for performing the first aspect.

According to a fifth aspect, a subframe configuration system is provided, and may include the root node network element provided in any of the second aspect or third aspect.

DESCRIPTION OF EMBODIMENTS

Figure 1:
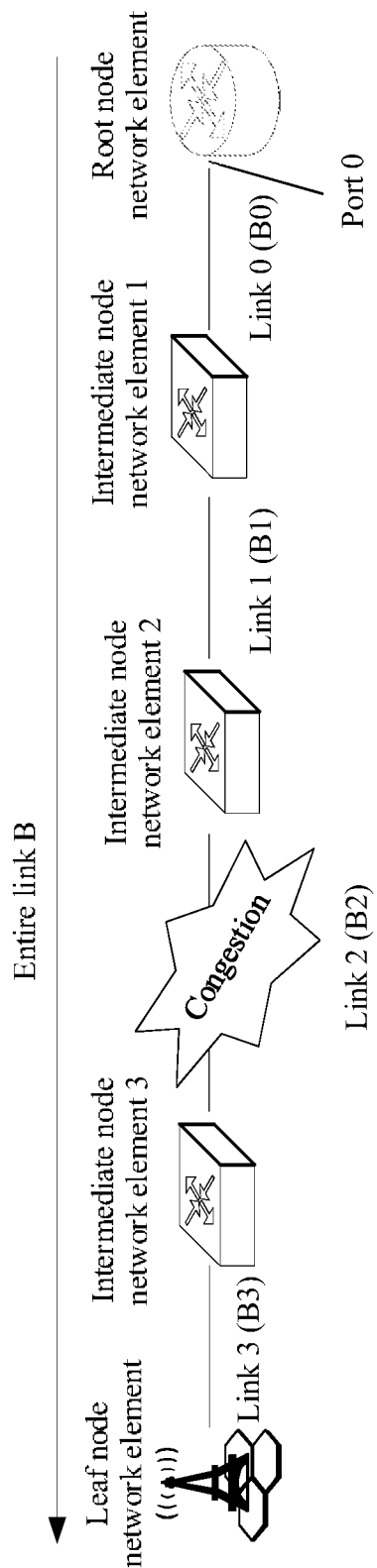
FIG. 1 is a schematic diagram of a network topology of a chain topology network in the prior art.

In a tree topology network, if some of a plurality of links connected directly to an intermediate node network element are congested, congestion control based on a prior-art method may reduce available bandwidth of another uncongested link directly connected to the intermediate node network element, thereby affecting a throughput of the entire network.

Based on this, embodiments of the present application provide a congestion control method and an apparatus. A basic principle of the present application is that a root node network element alleviates, by adjusting traffic sent to a port of an intermediate node network element, congestion on a link that is directly connected to the port and that is configured to transmit traffic to a leaf node network element. When determining that a link connected directly to a first port of a first intermediate node network element is congested, the root node network element determines an identifier of a first leaf node network element by using a correspondence between the identifier of the first port and the identifier of the first leaf node network element; then determines a service queue of the first leaf node network element based on a correspondence between the identifier of the first leaf node network element and an identifier of the service queue of the first leaf node network element; and lowers output bandwidth of the service queue of the first leaf node network element. Therefore, it can be ensured that bandwidth of a congested link connected directly to the first intermediate node network element is controlled without affecting bandwidth of another uncongested link connected directly to the first intermediate node network element, so that a throughput of the entire network is optimized compared with the prior art. In addition, after the root node network element lowers the output bandwidth of the service queue of the first leaf node network element, a redundant packet may be buffered in the root node network element, so that a large buffer (temporary storage) of the root node network element may be fully used.

Optionally, in this application, the correspondence between the identifier of the first port and the identifier of the first leaf node network element may be implemented by using a hardware scheduler or a software scheduler. Preferably, in a multi-link network, for example, a network including at least three links, the correspondence may be implemented by using the software scheduler. Therefore, the embodiments of the present application may be applicable to any complex tree topology network.

The following describes the technical solutions in the embodiments of the present application by way of example with reference to the accompanying drawings in the embodiments of the present application. Apparently, the described embodiments are merely a part rather than all of the embodiments of the present application.

The technical solutions provided in this application are applied to a tree topology network. The tree topology network includes one root node network element, a plurality of intermediate node network elements, and a plurality of leaf node network elements, and the root node network element transmits traffic to the plurality of leaf node network elements by using the plurality of intermediate node network elements. Each intermediate node network element has one or more ports, the port is configured to transmit traffic to a leaf node network element, and each port is directly connected to one intermediate node network element or one leaf node network element. A schematic diagram of a network topology structure of the tree topology network is shown in FIG. 3.

Figure 3:
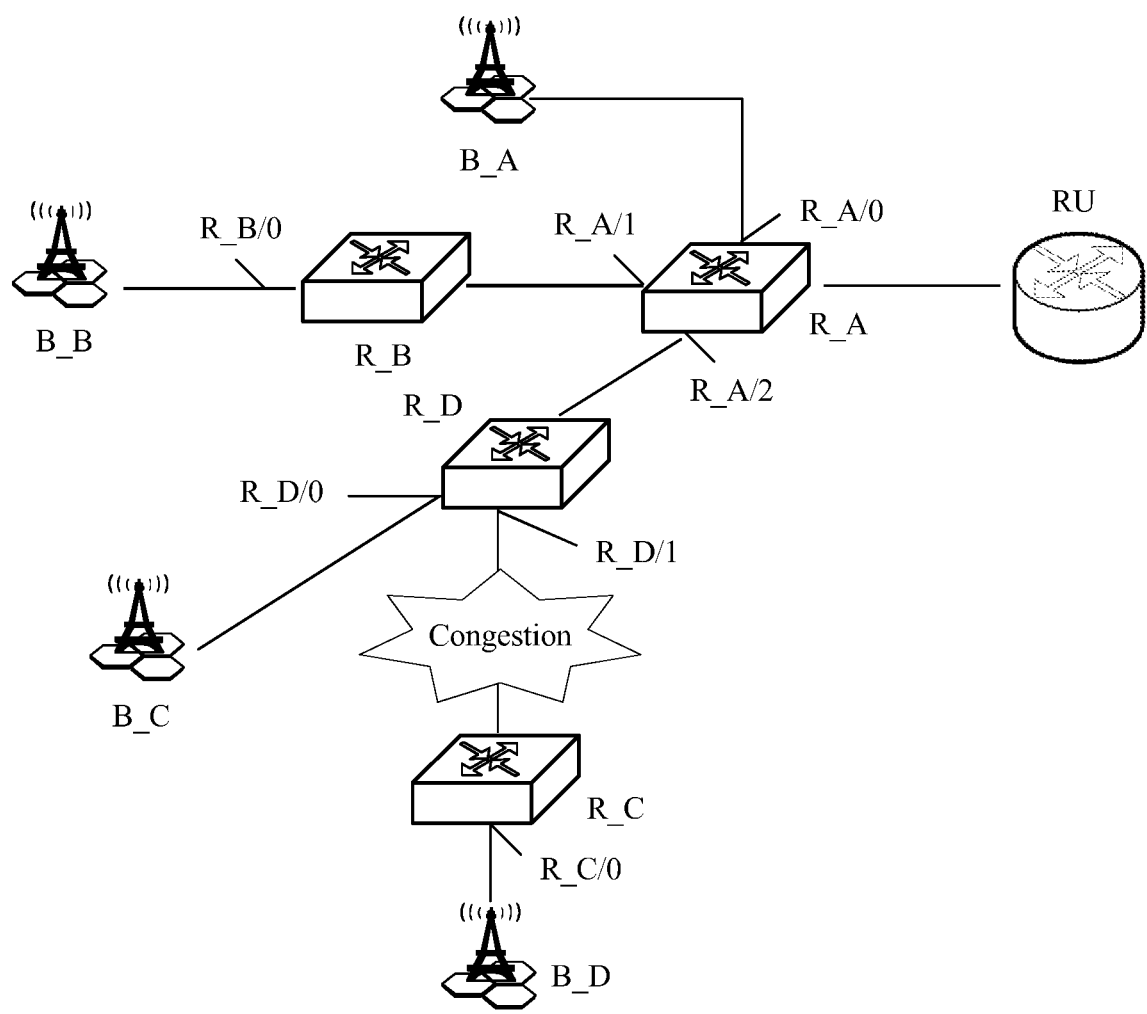
FIG. 3 is a schematic diagram of a network topology of another tree topology network according to an embodiment of the present application.

In FIG. 3, a root node network element RU and an intermediate node network element R_A that is directly connected to the root node network element RU are included, and the intermediate node network element R_A has three ports: R_A/0, R_A/1, and R_A/2. The port R_A/0 is directly connected to a leaf node network element B_A. The port R_A/1 is directly connected to an intermediate node network element R_B, the intermediate node network element R_B has a port R_B/0, and the port R_B/0 is directly connected to a leaf node network element B_B. The port R_A/2 is directly connected to an intermediate node network element R_D, and the intermediate node network element R_D has two ports: R_D/0 and R_D/1. The port R_D/0 is directly connected to a leaf node network element B_C, and the port R_D/1 is directly connected to an intermediate node network element R_C. The intermediate node network element R_C has a port R_C/0, and the port R_C/0 is directly connected to a leaf node network element B_D.

Technical terms in this application are simply described below, to help a reader have a better understanding.

1) That A and B are directly connected means that A and B are connected by using a link, and no other network element exists on the link. That A and B are indirectly connected means that A is connected to B by using a link through at least one other network element.

2) A network element may be a physical entity network element in a hardware form, or may be a logical functional entity network element in a software form.

A root node network element is a network element that has a child node network element but does not have a parent node network element in a network. The root node network element may be a device that supports a large capacity buffer and queue management, for example, a router device or a layer-3 switch device. The root node network element has one or more ports that are configured to transmit traffic to a leaf node network element, and each port may be directly connected to one intermediate node network element or one leaf node network element.

An intermediate node network element is a network element that has both a parent node network element and a child node network element in a network. The intermediate node network element may be a device that supports a small capacity buffer, for example, a microwave device, a router, or a switch. It should be noted that a device may be configured as a root node network element or an intermediate node network element based on an actual configuration. For example, when a switch device supports a large capacity buffer and queue management, the switch device may be configured as a root node network element; when a switch device supports a small capacity buffer, the switch device may be configured as an intermediate node network element.

The intermediate node network element has one or more ports that are configured to transmit traffic to a leaf node network element, and each port may be directly connected to one intermediate node network element or one leaf node network element. An intermediate node network element can monitor link status information of each link that is directly connected to the intermediate node network element. For example, in FIG. 3, an intermediate node network element R_D can monitor link status information of the following links: a link that is directly connected to a port R_D/0, the link between the port R_D/0 and a leaf node network element B_C, and a link that is directly connected to a port R_D/1, the link between the port R_D/1 and an intermediate node network element R_C.

A leaf node network element is a network element that has a parent node network element but does not have a child node network element in a network. The leaf node network element may be a device for receiving network traffic, for example, a base station or a CE (customer edge) device.

3) A service queue is a queue including service data of any type of service. A service classification manner is not limited in the embodiments of the present application. For example, the service queue may include but is not limited to an AF (assured forwarding) service queue, an EF (expedited forwarding) service queue, a BE (best-effort) service queue, and the like.

A service queue of a leaf node network element is a service queue transmitted by a root node network element to a leaf node network element. There may be one or more types of service queues on a same leaf node network element, and types of service queues on different leaf node network elements may be the same or may be different. Content (service data) of service queues of a same type on different leaf node network elements may be the same or may be different. In this application, description is provided by using an example in which each leaf node network element supports eight types of service queues, and the service queues of each leaf node network element are service queues 1, 2, 3, 4, 5, 6, 7, and 8, as shown in Table 1. Table 1 is a correspondence table between four leaf node network elements B_A, B_B, B_C, and B_D in FIG. 3 and service queues of each of the four leaf node network elements.

TABLE 1

| Leaf node network element | Service queue |
| --- | --- |
| Leaf node network element B_A | Service queues 1A, 2A, 3A, 4A, 5A, 6A, 7A, and 8A |
| Leaf node network element B_B | Service queues 1B, 2B, 3B, 4B, 5B, 6B, 7B, and 8B |
| Leaf node network element B_C | Service queues 1C, 2C, 3C, 4C, 5C, 6C, 7C, and 8C |
| Leaf node network element B_D | Service queues 1D, 2D, 3D, 4D, 5D, 6D, 7D, and 8D |

Because content of service queues of a same type on different leaf node network elements may be different, in Table 1, identifiers of service queues of a same type on different leaf node network elements are different. For example, identifiers of service queues 1 on the leaf node network elements B_A, B_B, B_C, and B_D are respectively service queues 1A, 1B, 1C, and 1D.

In addition, Table 1 shows eight service queue types supported by each leaf node network element. In an actual scenario, a leaf node network element is allowed to use some of the service queue types. For example, the leaf node network element B_A uses service queue types 1A, 2A, 3A, and 4A.

A root node network element may record a correspondence between each leaf node network element in a network including the root node network element and a service queue of the leaf node network element.

A service queue of a node network element (a root node network element or an intermediate node network element) is a service queue transmitted by the node network element. The service queue of a node network element (a root node network element or an intermediate node network element) may be considered as aggregation of service queues of a child node network element that is directly connected to the node network element. In this way, based on FIG. 3 and Table 1, Table 2 shows service queues transmitted by each intermediate node network element and the root node network element.

TABLE 2

| Node network element | Directly connected child node network element | Service queue |
| --- | --- | --- |
| Intermediate node network element R_B | Leaf node network element B_B | Service queues 1B to 8B |
| Intermediate node network element R_C | Leaf node network element B_D | Service queues 1D to 8D |
| Intermediate node network element R_D | Leaf node network element B_C | Service queues 1C to 8C |
| | Intermediate node network element R_C | Service queues 1D to 8D |
| Intermediate node network element R_A | Leaf node network element B_A | Service queues 1A to 8A |
| | Intermediate node network element R_B | Service queues 1B to 8B |
| | Intermediate node network element R_D | Service queues 1C to 8C and service queues 1D to 8D |
| Root node network element RU | Intermediate node network element R_A | Service queues 1A to 8A, service queues 1B to 8B, service queues 1C to 8C, and service queues 1D to 8D |

An intermediate node network element may usually record a service queue of a child node network element that is directly connected to the intermediate node network element, and does not record a service queue of a child node network element that is indirectly connected to the intermediate node network element. This is because if each intermediate node network element records both a service queue of a child node network element that is directly connected to the intermediate node network element and a service queue of a child node network element that is indirectly connected to the intermediate node network element, an intermediate node network element that is closer to a root node network element needs to record more information, and therefore there is a higher requirement for a processing capability and the like of the intermediate node network element. In consideration of problems such as costs and design complexity, an intermediate node network element usually records only a service queue of a child node network element that is directly connected to the intermediate node network element.

A node network element (a root node network element or an intermediate node network element) combines service queues of a same type that are output from a port (a port that is configured to transmit traffic to a leaf node network element) of the node network element. For example, based on FIG. 3 and Table 2, the intermediate node network element R_A combines a service queue iC and a service queue iD in service queues 1C to 8C and 1D to 8D that are output from the port R_A/2, where $1 \leq i \leq 8$, and i is a positive integer.

In this way, if a port of an intermediate node network element transmits traffic to a plurality of leaf node network elements, the intermediate node network element knows only which service queues are output from the port, but does not know which service queue is finally transmitted to which leaf node network element. For example, in FIG. 3, a child node network element that is directly connected to the port R_A/2 of the intermediate node network element R_A is the intermediate node network element R_D. Therefore, the intermediate node network element R_A records only a correspondence between the port R_A/2, the intermediate node network element R_D, and service queues (service queues 1C to 8C and 1D to 8D) of the intermediate node network element R_D. The intermediate node network element R_A knows only that the service queues 1C to 8C and 1D to 8D are output from the port R_A/2 to the intermediate node network element R_D, but does not know which service queues finally arrive on the leaf node network element B_C and which service queues finally arrive on the leaf node network element B_D.

If a port of an intermediate node network element transmits traffic to only one leaf node network element, the intermediate node network element knows that these service queues finally arrive on the leaf node network element. For example, the port R_D/1 of the intermediate node network element R_D is connected to only one leaf node network element B_D. Therefore, a service queue that is output from the port R_D/1 finally arrives on the leaf node network element B_D.

4) A port queue is a queue including all service queues transmitted through a port. The "port" herein may be a port that is of a root node network element or an intermediate node network element and that is configured to transmit traffic to a leaf node network element.

In addition, "a plurality of" in this specification means two or more. "First" and "second" are intended to more clearly distinguish between different objects but not to describe a particular order of the objects. Unless otherwise specified, a "port" in this application is a port that is configured to transmit traffic to a leaf node network element, and a "link" is a link that is configured to transmit traffic to a leaf node network element.

Figure 4:
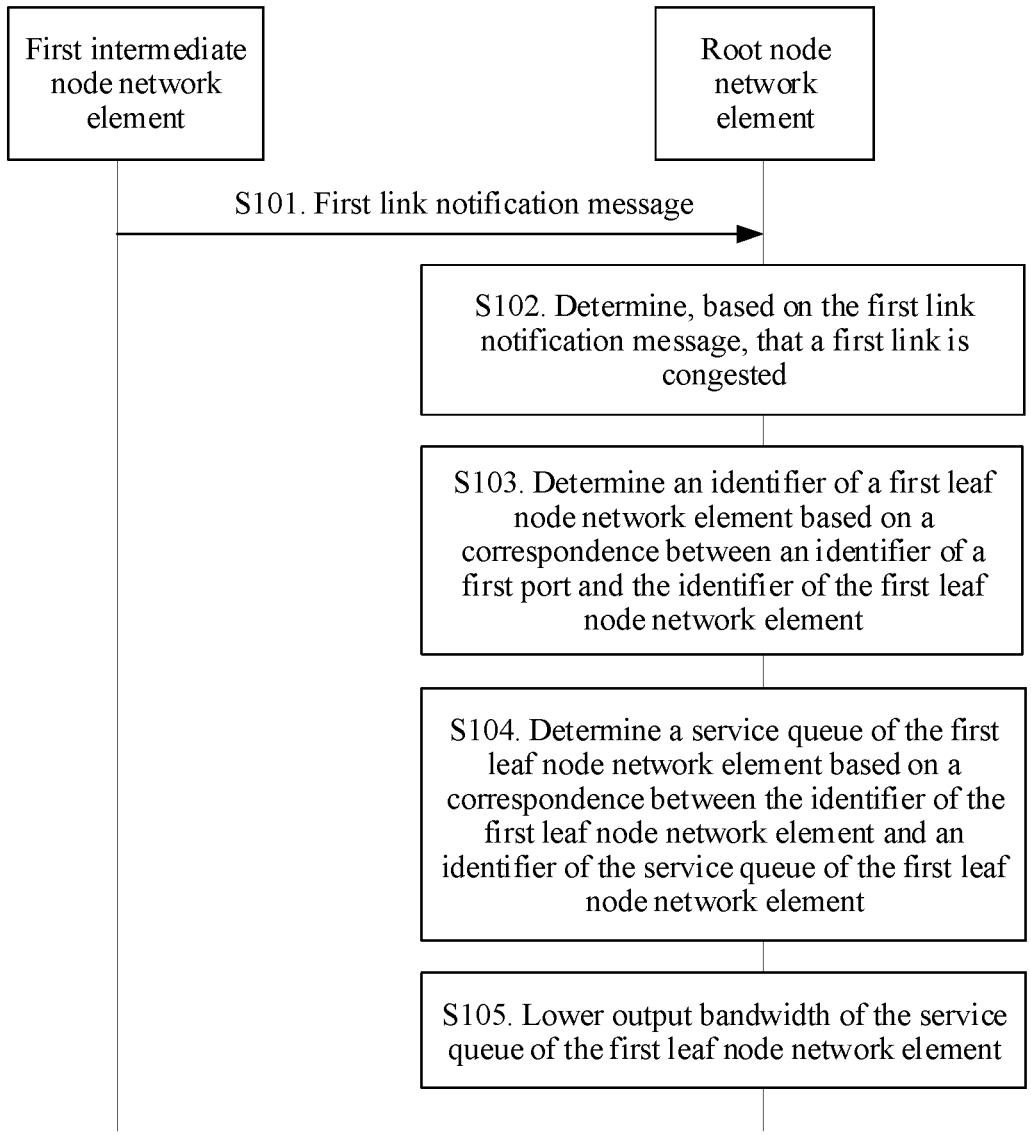
FIG. 4 is a schematic flowchart of a congestion control method according to an embodiment of the present application.

As shown in FIG. 4, FIG. 4 is a schematic flowchart of a congestion control method according to an embodiment of the present application. The method shown in FIG. 4 is applied to a tree topology network, and the tree topology network (referred to as a "network" below) includes a root node network element, a first intermediate node network element, and a first leaf node network element. A schematic diagram of a network topology of the tree topology network is shown in FIG. 3. The method shown in FIG. 4 may include the following operations.

S101. The first intermediate node network element sends a first link notification message to the root node network element, where the first link notification message carries link status information of a first link that is directly connected to a first port of the first intermediate node network element and an identifier of the first port, and the first link is configured to transmit traffic from the first intermediate node network element to the first leaf node network element.

The first intermediate node network element may be any intermediate node network element in the network. Preferably, the first intermediate node network element may be an intermediate node network element that has at least two ports in the network. The first port is any port of the first intermediate node network element.

The first link notification message includes but is not limited to bandwidth notification information stipulated in Y.1731, or customized alarm information. Y.1731 is a protocol in the ITU-T (International Telecommunication Union—Telecommunication Standardization Sector).

For example, "link status information of a link" may be information that the link is congested, or may be information about some indicators (such as available bandwidth and a depth of a service queue of a port) indicating a link status of the link. The link may be the first link, or may be a second link described below.

An intermediate node network element may monitor, periodically or in a trigger manner, an indicator of a link status of each link that is directly connected to the intermediate node network element, and send a link notification message to the root node network element by using a standardized protocol, a proprietary protocol, or the like. For example, when the first intermediate node network element is a microwave device, and the root node network element is a router device, the microwave device may send a link notification message to the router device by using a BCN (backward congestion notification) mechanism or a proprietary protocol. In this case, the first link is a microwave link.

In S101, after monitoring indicators of the link status of the first link and determining, based on the indicators, that the link is congested, the intermediate node network element may send the first link notification message to the root node network element. In this case, the link status information of the first link carried in the first link notification message is information that the first link is congested. Alternatively, in S101, after detecting indicators of the link status of the first link, the intermediate node network element may send the first link notification message to the root node network element. In this case, the link status information of the first link carried in the first link notification message is information about the indicators indicating the link status of the first link.

S102. The root node network element receives the first link notification message sent by the first intermediate node network element, and determines, based on the link status information of the first link in the first link notification message, that the first link is congested.

If the first link notification message carries the information that the first link is congested, in S102, after receiving the first link notification message, the root node network element can determine, without the need of performing a determining process, that the first link is congested. Alternatively, if the first link notification message carries the information about the indicators indicating the link status of the first link, in S102, the root node network element needs to determine, based on the information about the indicators and a determining condition, whether the first link is congested. In this embodiment of the present application, a method for determining, by the intermediate node network element or the root node network element, whether a link is congested is not limited.

For example, based on FIG. 3, it is assumed that the first intermediate node network element is an intermediate node network element R_D, and a link between the intermediate node network element R_D and an intermediate node network element R_C is congested. The intermediate node network element R_D sends the first link notification message to the root node network element. The first link notification message carries an identifier of a port R_D/1 (the first port), and the identifier is used to indicate that a link connected directly to the port R_D/1 is congested.

Optionally, the first link notification message may further carry an identifier of the first intermediate node network element.

S103. The root node network element determines an identifier of the first leaf node network element based on a correspondence between the identifier of the first port and the identifier of the first leaf node network element.

A correspondence between an identifier of a port and an identifier of a leaf node network element indicates that there is a communication relationship between the port and the leaf node network element. The correspondence between the identifier of the first port and the identifier of the first leaf node network element indicates that there is a communication relationship between the first port and the first leaf node network element. The first leaf node network element may be any leaf node network element that communicates with the first port, and may be any leaf node network element that is directly connected to the first intermediate node network element through the first port, or may be any leaf node network element that is indirectly connected to the first leaf node network element through the first port.

The root node network element may obtain in advance and store the correspondence between the identifier of the first port and the identifier of the first leaf node network element, or may obtain the correspondence between the identifier of the first port and the identifier of the first leaf node network element after S102. The correspondence that is between the identifier of the first port and the identifier of the first leaf node network element and that is obtained by the root node network element may be entered by a user, or may be obtained by the root node network element from the first intermediate node network element, or may be obtained by the root node network element based on the tree topology. For example, the root node network element generates, based on the tree topology, a correspondence table between an identifier of each port of one of a plurality of intermediate node network elements and an identifier of one of a plurality of leaf node network elements. Each port of the intermediate node network element is a port that is of the intermediate node network element and that is configured to transmit traffic to a leaf node network element. The root node network element obtains the correspondence between the identifier of the first port and the identifier of the first leaf node network element based on the correspondence table. The root node network element may obtain a topology of all node network elements in the network by using the NTDP (network topology discovery protocol), to obtain a tree topology. The NTDP may include but is not limited to the LLDP (link layer discovery protocol). A network topology (which is a tree topology in this application) may be maintained by using a centralized management device such as a network management platform or a root node network element (for example, a router device in a network).

For example, a correspondence between an identifier of a port of each intermediate node network element in FIG. 3 and an identifier of a leaf node network element may be shown in Table 3.

TABLE 3

| Identifier of a port of an intermediate node network element | Identifier of a leaf node network element |
| --- | --- |
| R_A/0 | Leaf node network element B_A |
| R_A/1 | Leaf node network element B_B |
| R_A/2 | Leaf node network element B_C and leaf node network element B_D |

TABLE 3-continued

| Identifier of a port of an intermediate node network element | Identifier of a leaf node network element |
| --- | --- |
| R_B/0 | Leaf node network element B_B |
| R_C/0 | Leaf node network element B_D |
| R_D/0 | Leaf node network element B_C |
| R_D/1 | Leaf node network element B_D |

Based on the example in S102, Table 3 shows that the first leaf node network element in S103 is the leaf node network element B_D that is indirectly connected to the first intermediate node network element R_D through the first port R_D/1.

S104. The root node network element determines a service queue of the first leaf node network element based on a correspondence between the identifier of the first leaf node network element and an identifier of the service queue of the first leaf node network element, where the service queue of the first leaf node network element is a service queue transmitted by the root node network element to the first leaf node network element.

Optionally, before S104, the method may further include: obtaining, by the root node network element, the correspondence between the identifier of the first leaf node network element and the identifier of the service queue of the first leaf node network element based on a correspondence table between an identifier of a leaf node network element on a network path on which the root node network element is located and an identifier of a service queue of the leaf node network element. The correspondence table includes at least a correspondence between an identifier of at least one leaf node network element on the network path and a service queue of the at least one leaf node network element. Preferably, the correspondence table includes at least a correspondence between identifiers of all leaf node network elements on the network path and identifiers of service queues of all the leaf node network elements. For example, based on FIG. 3, the correspondence table may be Table 1.

Based on the example in S103, service queues of the first leaf node network element (the leaf node network element B_D) that are determined in S104 are service queues 1D to 8D.

S105. The root node network element lowers output bandwidth of the service queue of the first leaf node network element.

Based on the example in S104, in S105, the root node network element lowers output bandwidth of some or all of the service queues 1D to 8D. In this way, based on FIG. 3, if one (for example, the link between the intermediate node network element R_D and the intermediate node network element R_C) of links connected directly to the intermediate node network element R_D is congested, after congestion control is performed, bandwidth of another link (for example, the link between the intermediate node network element R_D and the leaf node network element B_C) is not affected. Therefore, a throughput of the entire network can be optimized compared with the prior art.

It should be noted that, in principle, the root node network element can alleviate or eliminate congestion on the first link by lowering only output bandwidth of service queues of some leaf node network elements that communicate with the first port. Actually, to be fair, the root node network element usually lowers output bandwidth of service queues of all leaf node network elements that communicate with the first port.

In this case, in S103, the root node network element may obtain identifiers of all the leaf node network elements that are corresponding to the identifier of the first port. In an implementation, the root node network element may lower output bandwidth of some or all of service queues of any quantity of leaf node network elements that communicate with the first port. For example, the root node network element may lower output bandwidth of a service queue that is greater than or equal to a preset value.

The congestion control method provided in this embodiment of the present application can ensure that bandwidth of a congested link connected directly to the first intermediate node network element is controlled without affecting bandwidth of another uncongested link connected directly to the first intermediate node network element, so that a throughput of the entire network is optimized compared with the prior art. In addition, compared with the prior art, the technical solution provided in this embodiment of the present application may indirectly improve the throughput of the entire network, and this is explained below by using an example.

Figure 2:
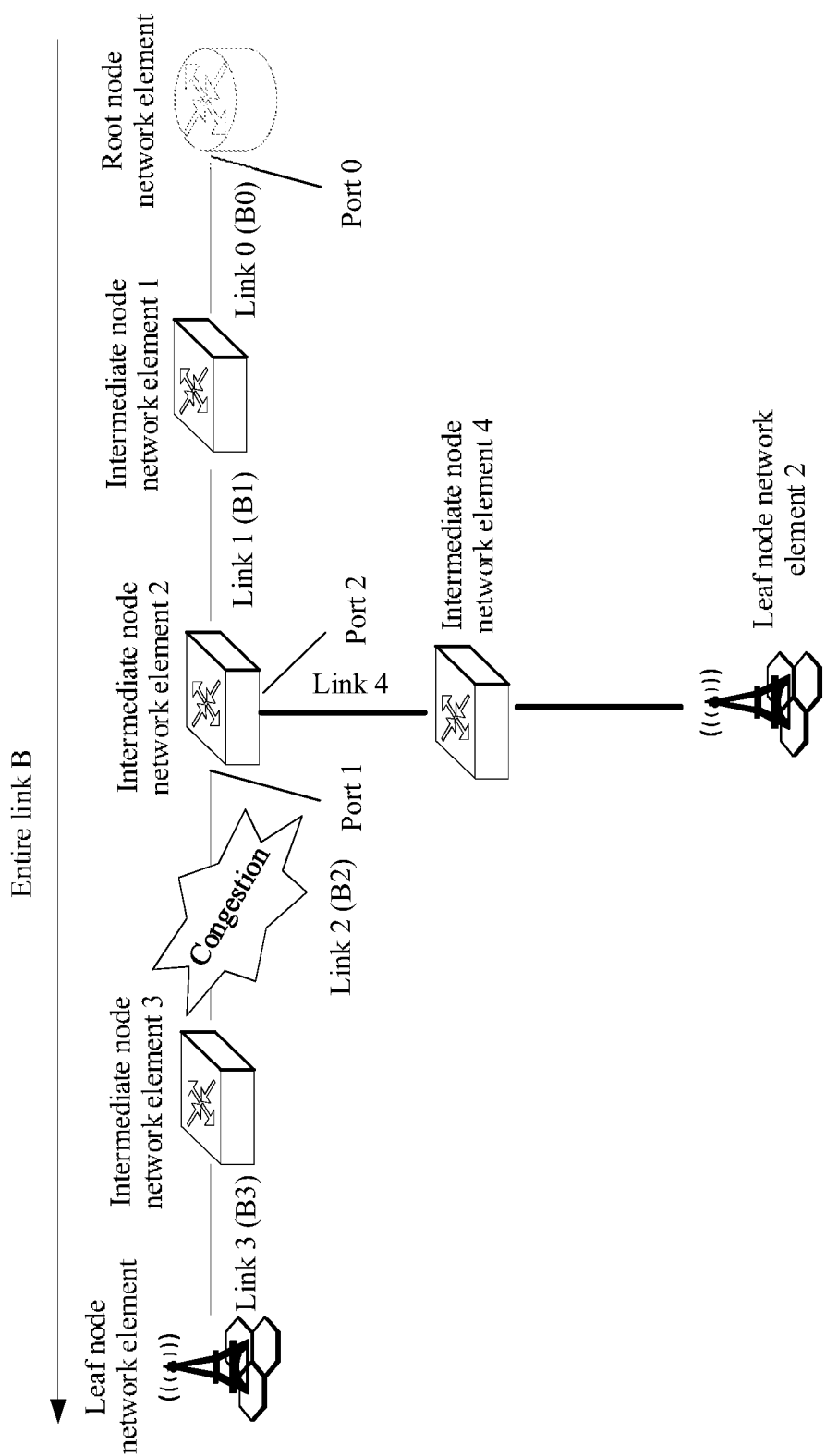
FIG. 2 is a schematic diagram of a network topology of a tree topology network according to an embodiment of the present application.

A congested link 2 in FIG. 2 is used as an example. It is assumed that output bandwidth of a port 1 of an intermediate node network element 2 is 3 times higher than output bandwidth of a port 2, a current total throughput of the network is 1000 M (mega), and congestion on the link 2 can be exactly eliminated after the output bandwidth of the port 1 is lowered by 150 M. If congestion control is performed according to a prior-art method, the root node network element needs to lower output bandwidth of a port 0 by 200 M. Consequently, the output bandwidth of the port 1 can be lowered exactly by 150 M, and the congestion on the link 2 can be exactly eliminated. In this case, the total throughput of the network is 800 M after congestion on the link 2 is eliminated. If congestion control is performed according to the method provided in this embodiment of the present application, the root node network element may directly lower the output bandwidth transmitted to the port 1 by 150 M, to exactly eliminate congestion on the link 2. In this case, the total throughput of the network is 850 M after congestion on the link 2 is eliminated.

Optionally, the link status information of the first link includes at least one piece of the following information:

(1) information that the first link is congested;

(2) information that a packet loss exists on the first link;

(3) information that a depth of a port queue of the first port is greater than or equal to a preset threshold, where the depth of the port queue refers to a difference between input traffic of the first port and output traffic of the first port; or (4) a value of available bandwidth of the first link.

If the link status information of the first link is (1), after receiving the first congestion notification message, the root node network element may directly perform S103.

If the link status information of the first link is any one of (2), (3), and (4), the root node network element may determine, based on the received link status information of the first link, whether the first link is congested, and perform S103 when determining that the first link is congested. Compared with the prior art, there may be a plurality of types of information indicating the link status of the first link in this application.

Figure 5:
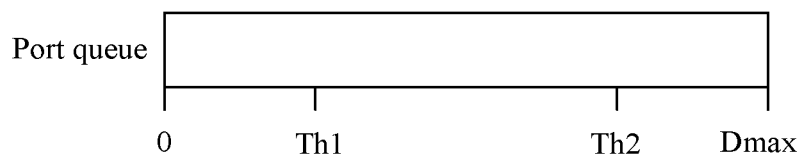
FIG. 5 is a schematic diagram of a port queue of a first port according to an embodiment of the present application.

For example, in an implementation, (2) and (3) may be implemented in the following manner:

As shown in FIG. 5, FIG. 5 is a schematic diagram of a port queue of a first port according to an embodiment of the present application. In an implementation, the first intermediate node network element may set a first threshold (marked as Th1) and a second threshold (marked as Th2) for a depth (marked as D) of the port queue of the first port, where $0<Th1<Th2<Dmax$, and Dmax indicates a maximum value of the depth of the port queue of the first port when no packet loss occurs on the first link. In this way, for (2), the information that a packet loss exists on the first link may be indicated by using Dmax or "drop" (packet loss). When the first intermediate node network element detects that $D \geq Dmax$, it indicates that a packet loss occurs on the first link, and the first intermediate node network element sends Dmax or "drop" to the root node network element. For (3), the information that a depth of a port queue of the first port is greater than or equal to a preset threshold may be indicated by using Th2. When the first intermediate node network element detects that $Th2 \leq D < Dmax$, it indicates that traffic on the first link is relatively large, and the first intermediate node network element sends Th2 to the root node network element. In addition, in an implementation, when the first intermediate node network element detects $0 \leq D \leq Th1$, it indicates that traffic on the first link is relatively small, and the first intermediate node network element sends Th1 to the root node network element.

Figure 6:
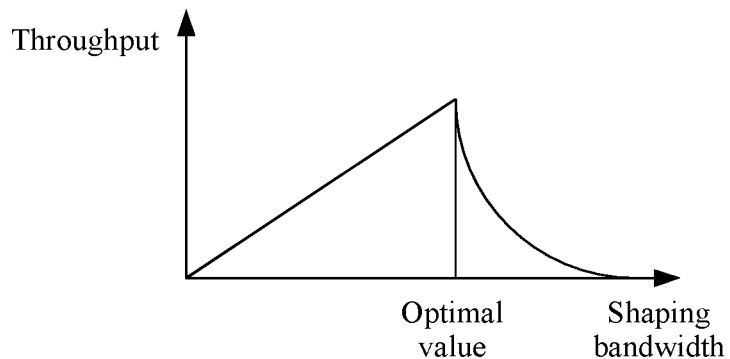
FIG. 6 is a schematic diagram of a relationship between bandwidth of input traffic of a link and a throughput of the link according to an embodiment of the present application.

It should be noted that, in theory, a relationship between bandwidth of input traffic of a link (shaping bandwidth of output traffic from the root node network element to the link) and a throughput of the link is shown in FIG. 6. It may be learned from FIG. 6 that when a value of the shaping bandwidth is equal to an optimal value, a throughput is maximum. The optimal value is a maximum value of bandwidth occupied by traffic that can be transmitted when the link is just uncongested. When the value of the shaping input bandwidth is less than the optimal value, a larger value of the shaping input bandwidth indicates a larger throughput, and the shaping input bandwidth and the throughput are approximately in a linear relationship. When the value of the shaping input bandwidth is greater than the optimal value, a larger value of the shaping input bandwidth indicates a smaller throughput, and the shaping input bandwidth and the throughput are approximately in an exponential relationship.

In an implementation, the root node network element may adjust bandwidth of input traffic of a link in a plurality of manners, to ensure as much as possible that the bandwidth of the input traffic of the link is equal to the optimal value, so as to achieve a maximum throughput. In this embodiment of the present application, the adjustment manner is not limited. Several adjustment manners are described below by using an example in which adjusting output bandwidth of input traffic of the first link is adjusting output bandwidth of the service queue of the first leaf node network element.

In an optional implementation 1, S105 may include: lowering, by the root node network element, the output bandwidth of the service queue of the first leaf node network element by a first preset step. In this case, the method may further include: if the root node network element re-determines, within a preset time period after lowering the output bandwidth of the service queue of the first leaf node network element, that the first link is congested, continuing, by the root node network element, to lower the output bandwidth of the service queue of the first leaf node network element by the first preset step.

The first intermediate node network element may continuously monitor the link status of the first link, and report the detected first link status information to the root node network element. Each time receiving the link status information, the root node network element determines whether a link including the first port is congested. Each time determining that the link including the first port is congested, the root node network element lowers the output bandwidth of the service queue of the first leaf node network element by the first preset step. When determining, within the preset time period after lowering the output bandwidth of the service queue of the first leaf node network element, that the first link is uncongested, the root node network element stops lowering the output bandwidth, and congestion on the first link is eliminated. Preferably, each time determining that the link including the first port is congested, the root node network element lowers output bandwidth of service queues of all leaf node network elements that communicate with the first port by the first preset step. When determining, within the preset time period after lowering the output bandwidth of the service queues of the leaf node network elements, that the first link is uncongested, the root node network element stops lowering the output bandwidth. A specified value of the first preset step and a specified value of the preset time period are not limited in this embodiment of the present application, and may be set based on an actual application scenario.

In an optional implementation 2, S105 may include: adjusting, by the root node network element, the output bandwidth of the service queue of the first leaf node network element in a dichotomy manner. Each time determining that the first link is congested, the root node network element lowers bandwidth of the service queue of the first leaf node network element to a half of current output bandwidth. When determining that the first link is uncongested, the root node network element stops lowering the output bandwidth. Preferably, each time determining that the first link is congested, the root node network element lowers bandwidth of service queues of all leaf node network elements that are connected to the first intermediate node network element through the first port to a half of current output bandwidth. When determining that the first link is uncongested, the root node network element stops lowering the output bandwidth.

In an optional implementation 3, S105 may include: lowering, by the root node network element, the output bandwidth of the service queue of the first leaf node network element by a first preset step. In this case, the method may further include: if the root node network element determines, within a preset time period after lowering the output bandwidth of the service queue of the first leaf node network element, that the first link is uncongested, raising, by the root node network element, the output bandwidth of the service queue of the first leaf node network element by a second preset step, where the second preset step is less than the first preset step.

In the optional implementation 3, when lowering, according to the method provided in the optional implementation 1 or 2, the output bandwidth of the service queue of the first leaf node network element one or more times and determining, according to the method provided in the optional implementation 1 or 2, that the first link is uncongested, the root node network element may raise the output bandwidth of the service queue of the first intermediate node network element by the second preset step. Preferably, when lowering, one or more times according to the method provided in the optional implementation 1 or 2, output bandwidth of service queues of any quantity of or all leaf node network elements that communicate with the first port and then determining, according to the method provided in the optional implementation 1 or 2, that the first link is uncongested, the root node network element may raise the output bandwidth of the service queues of any quantity of or all the leaf node network elements by the second preset step one or more times.

It should be noted that, in an implementation, the output bandwidth of the service queue of the first leaf node network element may be "raised" or "lowered" a plurality of times by using different preset thresholds, to ensure that congestion on the first link is eliminated and the network throughput is maximum. The optional implementation may be understood as follows: After a congestion alarm on the first link disappears (the first link is determined as uncongested), the root node network element slowly recovers bandwidth, and this is similar to slow recovery in TCP (transmission control protocol).

Figure 7A:
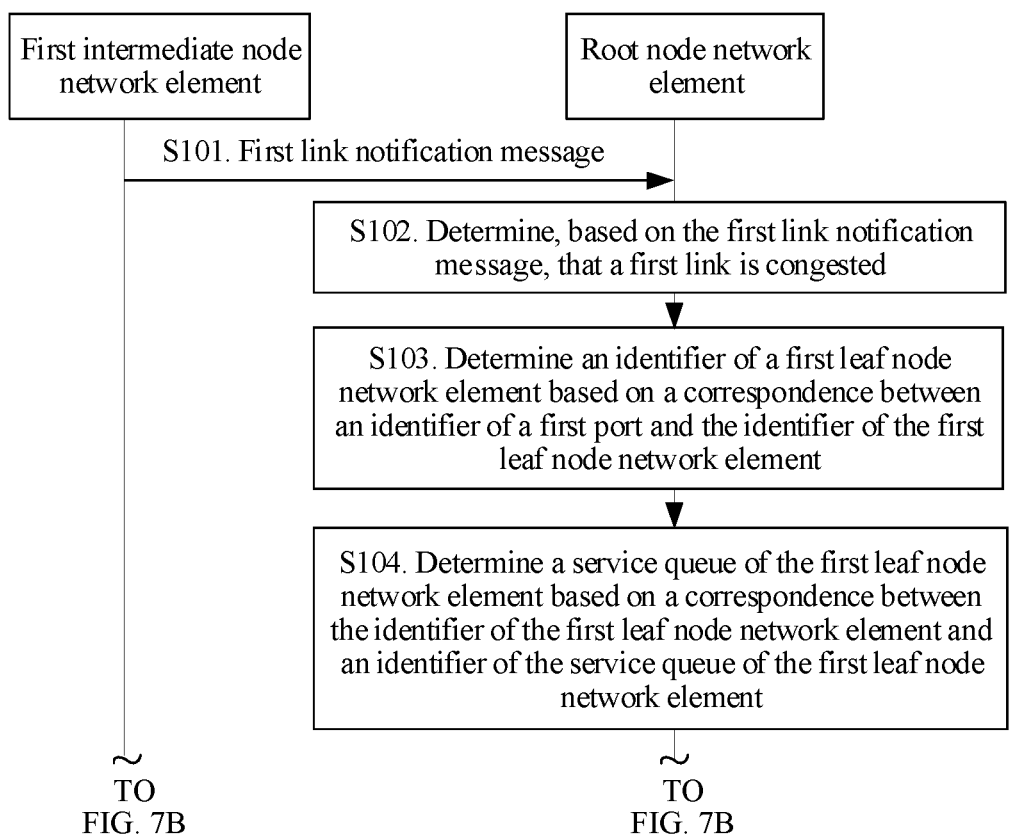
FIG. 7A and FIG. 7B are a schematic flowchart of another congestion control method according to an embodiment of the present application.
Figure 7B:
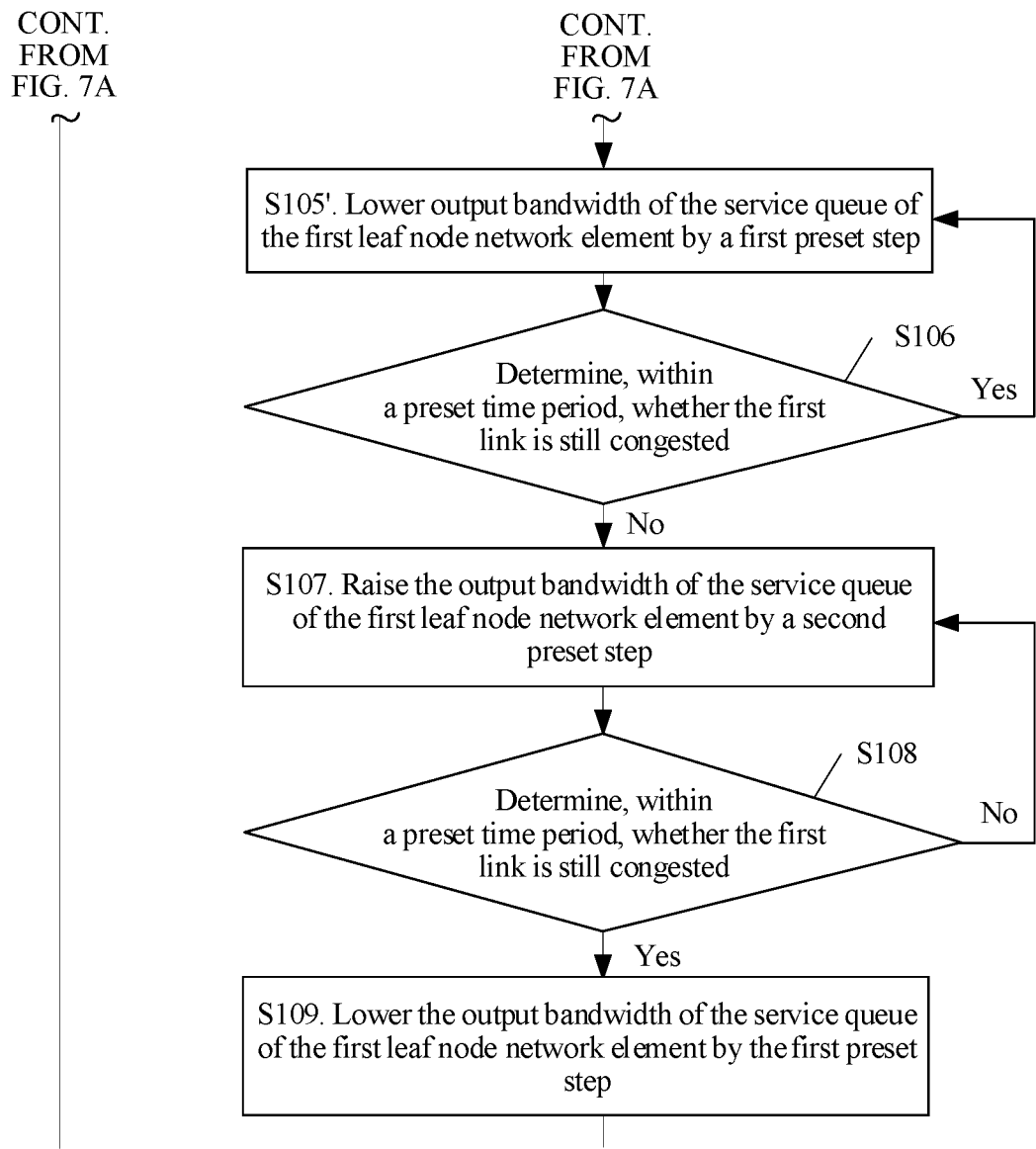

The congestion control method that includes the optional implementation 1 and the optional implementation 3 is shown in FIG. 7A and FIG. 7B, and may include the following operations.

S105'. The root node network element lowers the output bandwidth of the service queue of the first leaf node network element by a first preset step. S105' is a an implementation of S105.

S106. The root node network element determines, within a preset time period after lowering the output bandwidth of the service queue of the first leaf node network element, whether the first link is still congested.

If the first link is still congested, go back to S105'. If the first link is uncongested, perform S107.

S107. The root node network element raises the output bandwidth of the service queue of the first leaf node network element by a second preset step, where the second preset step is less than the first preset step.

S108. The root node network element determines, within the preset time period after raising the output bandwidth of the service queue of the first leaf node network element, whether the first link is congested.

If the first link is uncongested, go back to S107. If the first link is congested, perform S109.

S109. The root node network element lowers the output bandwidth of the service queue of the first leaf node network element by the first preset step.

Figure 8:
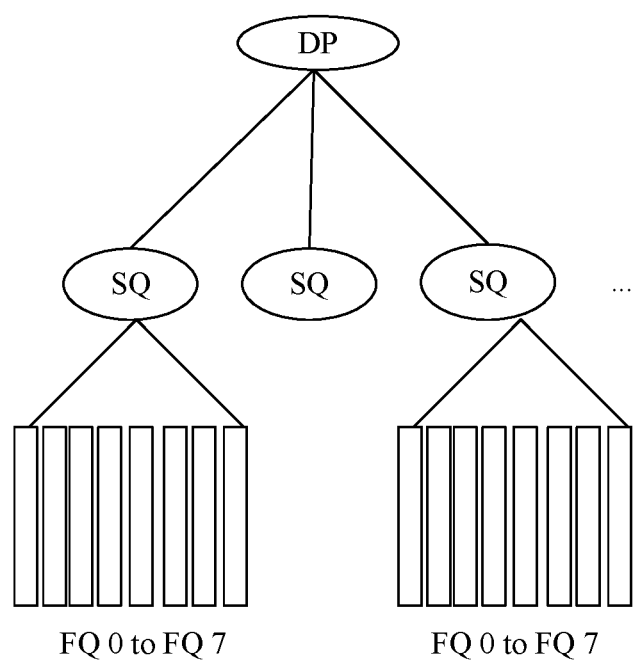
FIG. 8 is a schematic diagram of a connection relationship between DQ, SQ, and FQ in a QoS model according to an embodiment of the present application.

Optionally, S103 to S105 may be implemented in the following manner: The root node network element alleviates congestion on the first link by adjusting a QoS parameter in a QoS (quality of service) model in the network. The QoS parameter includes DQ (data port), SQ (subscriber queue), and FQ (flow queue). In this embodiment of the present application, DQ indicates the first port; SQ indicates traffic transmitted to a leaf node network element that communicates with the first port, a port queue of a port that is directly connected to the leaf node network element; and FQ indicates a service queue of a leaf node network element. A connection relationship between DQ, SQ, and FQ is shown in FIG. 8. FIG. 8 shows an example in which each leaf node network element has eight types of service queues: FQ 0 to FQ 7. That the root node network element alleviates or eliminates congestion on the first link by adjusting a QoS parameter may include: adjusting, by the root node network element by adjusting FQ, SQ that is connected to FQ, so that DQ is adjusted.

For example, based on FIG. 3, DQ indicates the port R_D/1, and there is a correspondence between DQ and one SQ. SQ indicates the port queue of the port R_C/0, and FQ 0 to FQ 7 indicate service queues of the leaf node network element B_D.

For example, it is assumed that the link between the R_A and the R_D in FIG. 3 is congested, DQ indicates the port R_A/2, and there is a correspondence between DQ and two SQ (marked as SQ 1 and SQ 2). SQ 1 indicates the port queue of the port R_D/0, and SQ 2 indicates the port queue of the port R_C/0. FQ 0 to FQ 7 that are connected to SQ 1 indicate service queues of the leaf node network element B_C, and FQ 0 to FQ 7 that are connected to SQ 2 indicate service queues of the leaf node network element B_D.

Figure 9:
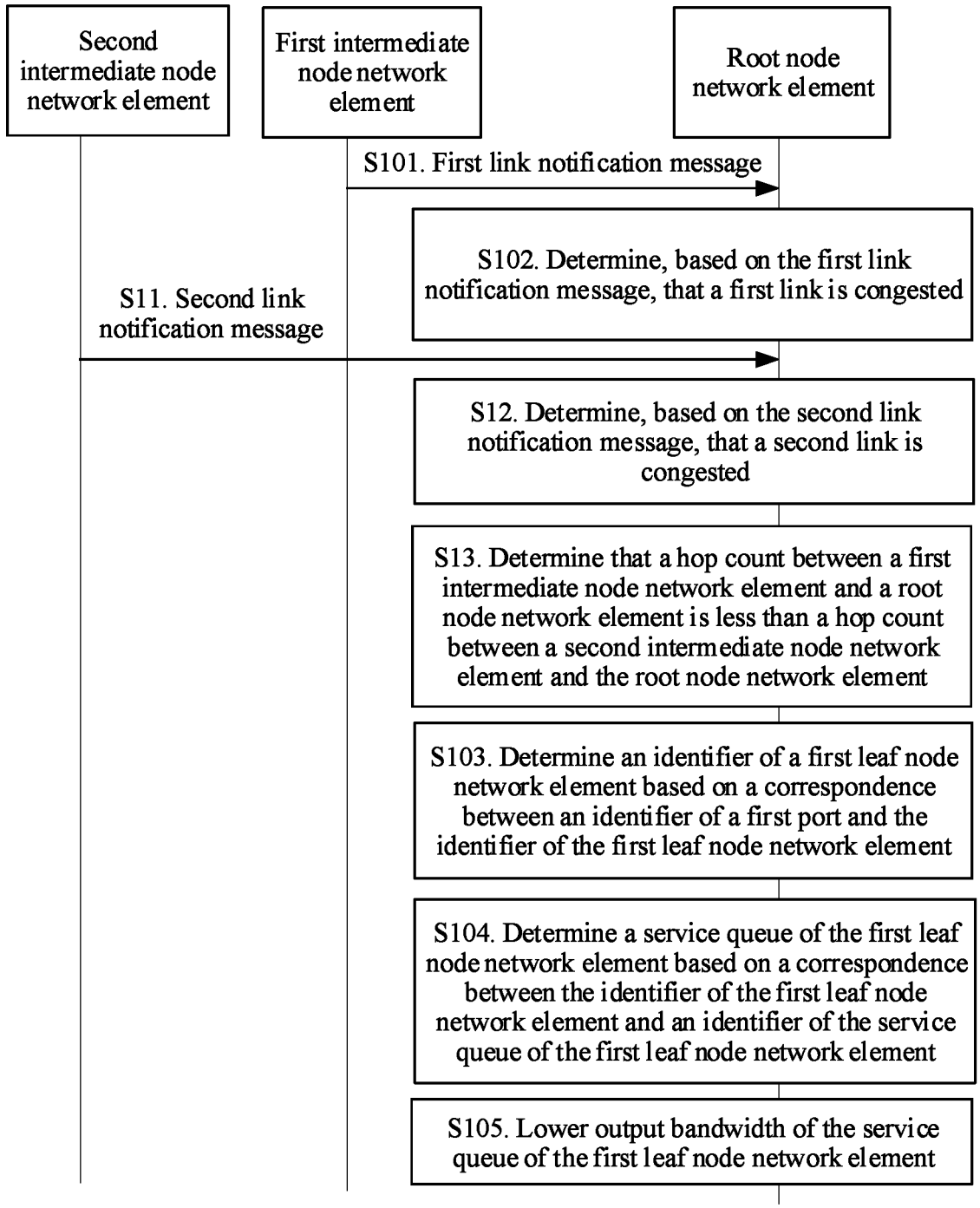
FIG. 9 is a schematic flowchart of another congestion control method according to an embodiment of the present application.

Optionally, the tree topology network may further include a second intermediate node network element. The first intermediate node network element is connected to the second intermediate node network element by using the first link. The second intermediate node network element is one of a plurality of intermediate node network elements in the tree topology network, and is any intermediate node network element connected to the first intermediate node network element by using the first link. For example, based on FIG. 3, the second intermediate node network element may be the intermediate node network element R_C. In this case, before S103, the method may further include S11 to S13, as shown in FIG. 9.

S11. The root node network element receives a second link notification message sent by the second intermediate node network element, where the second link notification message carries link status information of a second link that is directly connected to a second port of the second intermediate node network element, and the second link is configured to transmit traffic from the second intermediate node network element to the first leaf node network element.

S12. The root node network element determines, based on the link status information of the second link in the second link notification message, that the second link is congested.

S13. The root node network element determines that a hop count between the first intermediate node network element and the root node network element is less than a hop count between the second intermediate node network element and the root node network element.

An execution order between S101 to S102 and S11 to S13 is not limited in this embodiment of the present application. For example, S101 to S102 may be performed first, and then S11 to S13 are performed; or S11 to S13 may be performed first, and then S101 to S102 are performed; or S11 to S13 may be performed in a process of performing S101 to S102.

In the optional implementation, S103 is performed after S13. The optional implementation may be understood as follows: When the root node network element determines that a plurality of links connected directly to a plurality of intermediate node network elements are congested, and there is a communication relationship between the plurality of intermediate node network elements, the root node network element determines a congestion control order of the plurality of links based on an ascending order of hop counts between the plurality of intermediate node network elements and the root node network element.

Figure 10:
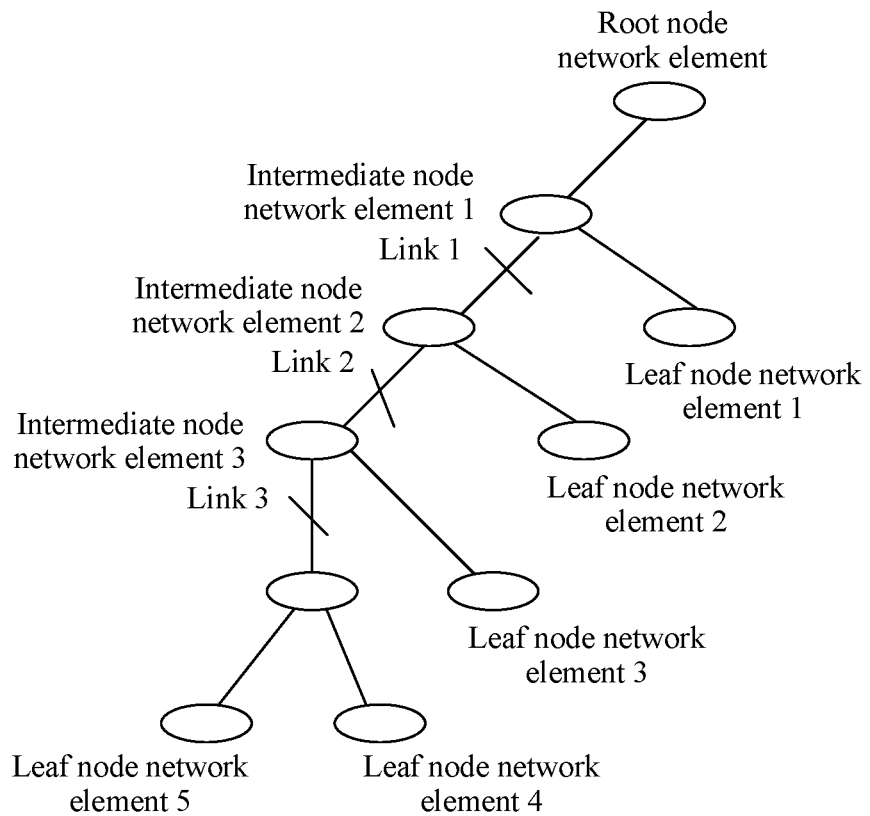
FIG. 10 is a schematic diagram of a network topology of another tree topology network according to an embodiment of the present application.

For example, as shown in FIG. 10, it is assumed that all links 1, 2, and 3 connected directly to intermediate node network elements 1, 2, and 3 respectively are congested, and an ascending order of hop counts between the intermediate node network elements 1, 2, 3 and the root node network element is the intermediate node network element 1, the intermediate node network element 2, and the intermediate node network element 3. In this case, the root node network element may perform congestion control in the following process: The root node network element preferably performs congestion control on the link 1, and then determines whether the link 2 is still congested; if the link 2 is still congested, performs congestion control on the link 2, and then determines whether the link 3 is congested; and if the link 3 is still congested, performs congestion control on the link 3. In addition, after performing congestion control on the link 1, the root node network element may also determine whether the link 3 is still congested; and if determining that both the link 2 and the link 3 are congested, preferably adjusts congestion on the link 2. In this process, when the link 1 is uncongested, congestion on the link 2 and the link 3 is alleviated to some extent, or even congestion on at least one of the link 2 or the link 3 is directly eliminated. This is because congestion control on the link 1 reduces not only traffic to the link 1 but also traffic to the link 2 and the link 3. Therefore, congestion control based on the optional implementation can eliminate congestion on the links 1, 2, and 3 as soon as possible.

Optionally, after operations shown in FIG. 9 are performed, the method may further include the following operations S21 to S24.

S21. The root node network element receives a third link notification message sent by the second intermediate node network element, where the third link notification message carries link status information of the second link and an identifier of the second port.

S22. The root node network element determines, based on the link status information of the second link carried in the third link notification message, that the second link is congested.

S23. The root node network element determines the identifier of the first leaf node network element based on a correspondence between the identifier of the second port and the identifier of the first leaf node network element.

S24. The root node network element determines a service queue of the first leaf node network element based on a correspondence between an identifier of the first leaf node network element and an identifier of the service queue of the first leaf node network element.

S25. The root node network element lowers output bandwidth of the service queue of the first leaf node network element.

For explanations of related content in the optional manner, refer to the foregoing descriptions. Details are not described herein again. It should be noted that in the optional implementation, the first intermediate node network element is connected to the first leaf node network element by using at least the first link and the second link. In this way, based on FIG. 10, if the first intermediate node network element is the intermediate node network element 1, the first link is the link 1, and the second link may be the link 2 or the link 3. If the second link is the link 2, the first leaf node network element may be any one of the leaf node network elements 3, 4, and 5. If the second link is the link 3, the first leaf node network element may be the leaf node network element 4 or the leaf node network element 5.

The following describes apparatus embodiments corresponding to the foregoing provided method embodiments. It should be noted that, for explanations of related content in the following apparatus embodiments, reference may be made to the foregoing method embodiments.

Figure 11:
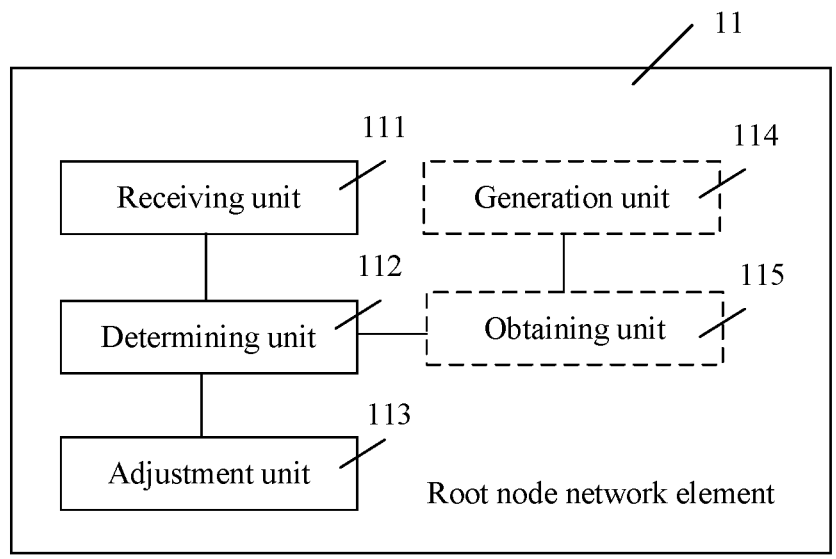
FIG. 11 is a schematic structural diagram of a root node network element according to an embodiment of the present application.

As shown in FIG. 11, FIG. 11 is a schematic structural diagram of a root node network element according to an embodiment of the present application. A root node network element 11 shown in FIG. 11 is configured to perform an action performed by the root node network element in any congestion control method provided above. The root node network element 11 is applied to a tree topology network, and the tree topology network may further include a first intermediate node network element and a first leaf node network element. The root node network element 11 may include a receiving unit 111, a determining unit 112, and an adjustment unit 113.

The receiving unit 111 is configured to receive a first link notification message sent by the first intermediate node network element, where the first link notification message carries link status information of a first link that is directly connected to a first port of the first intermediate node network element and an identifier of the first port, and the first link is configured to transmit traffic from the first intermediate node network element to the first leaf node network element.

The determining unit 112 is configured to: determine, based on the link status information of the first link in the first link notification message, that the first link is congested; determine an identifier of the first leaf node network element based on a correspondence between the identifier of the first port and the identifier of the first leaf node network element; and determine a service queue of the first leaf node network element based on a correspondence between the identifier of the first leaf node network element and an identifier of the service queue of the first leaf node network element, where the service queue of the first leaf node network element is a service queue transmitted by the root node network element 11 to the first leaf node network element.

The adjustment unit 113 is configured to lower output bandwidth of the service queue of the first leaf node network element.

Optionally, the link status information of the first link includes at least one piece of the following information: information that the first link is congested; information that a packet loss exists on the first link; information that a depth of a port queue of the first port is greater than or equal to a preset threshold, where the depth of the port queue refers to a difference between input traffic of the first port and output traffic of the first port; or a value of available bandwidth of the first link.

Optionally, the tree topology network includes a plurality of intermediate node network elements and a plurality of leaf node network elements. The plurality of intermediate node network elements include the first intermediate node network element, and the plurality of leaf node network elements include the first leaf node network element. The root node network element 11 may further include a generation unit 114 and an obtaining unit 115.

The generation unit 114 is configured to generate, based on the tree topology, a correspondence table between an identifier of each port of one of the plurality of intermediate node network elements and an identifier of one of the plurality of leaf node network elements, where each port of the intermediate node network element is a port that is of the intermediate node network element and that is configured to transmit traffic to the leaf node network element.

The obtaining unit 115 is configured to obtain the correspondence between the identifier of the first port and the identifier of the first leaf node network element.

Optionally, the adjustment unit 113 may be configured to lower the output bandwidth of the service queue of the first leaf node network element by a first preset step. The determining unit 112 may be further configured to re-determine, within a preset time period after the adjustment unit 113 lowers the output bandwidth of the service queue of the first leaf node network element, that the first link is congested. The adjustment unit 113 may be further configured to continue to lower the output bandwidth of the service queue of the first leaf node network element by the first preset step.

Optionally, the adjustment unit 113 may be configured to lower the output bandwidth of the service queue of the first leaf node network element by a first preset step. The determining unit 112 may be further configured to determine, within a preset time period after the adjustment unit 113 lowers the output bandwidth of the service queue of the first leaf node network element, that the first link is uncongested. The adjustment unit 113 may be further configured to raise the output bandwidth of the service queue of the first leaf node network element by a second preset step, where the second preset step is less than the first preset step.

Optionally, the tree topology network may further include a second intermediate node network element, and the first intermediate node network element is connected to the second intermediate node network element by using the first link. In this case, the receiving unit 111 may be further configured to receive a second link notification message sent by the second intermediate node network element, where the second link notification message carries link status information of a second link that is directly connected to a second port of the second intermediate node network element, and the second link is configured to transmit traffic from the second intermediate node network element to the first leaf node network element. The determining unit 112 may be further configured to: determine, based on the link status information of the second link in the second link notification message, that the second link is congested, and determine that a hop count between the first intermediate node network element and the root node network element 11 is less than a hop count between the second intermediate node network element and the root node network element 11.

Optionally, the receiving unit 111 may be further configured to receive a third link notification message sent by the second intermediate node network element, where the third link notification message carries link status information of the second link and an identifier of the second port. In this case, the determining unit 112 may be further configured to: determine, based on the link status information of the second link carried in the third link notification message, that the second link is congested; determine the identifier of the first leaf node network element based on a correspondence between the identifier of the second port and the identifier of the first leaf node network element; and determine a service queue of the first leaf node network element based on a correspondence between an identifier of the first leaf node network element and an identifier of the service queue of the first leaf node network element. The adjustment unit 113 may be further configured to lower output bandwidth of the service queue of the first leaf node network element.

In hardware implementation, the receiving unit 111 may be a receiver. In an implementation, the root node network element 11 may further include a transmitter, and the transmitter and the receiver may be integrated into a transceiver. The determining unit 112, the adjustment unit 113, the generation unit 114, and the obtaining unit 115 may be built in or independent of a processor of the root node network element 11 in a hardware form, or may be stored in a memory of the root node network element 11 in a software form, so that the processor invokes and performs operations corresponding to the foregoing modules.

Figure 12:
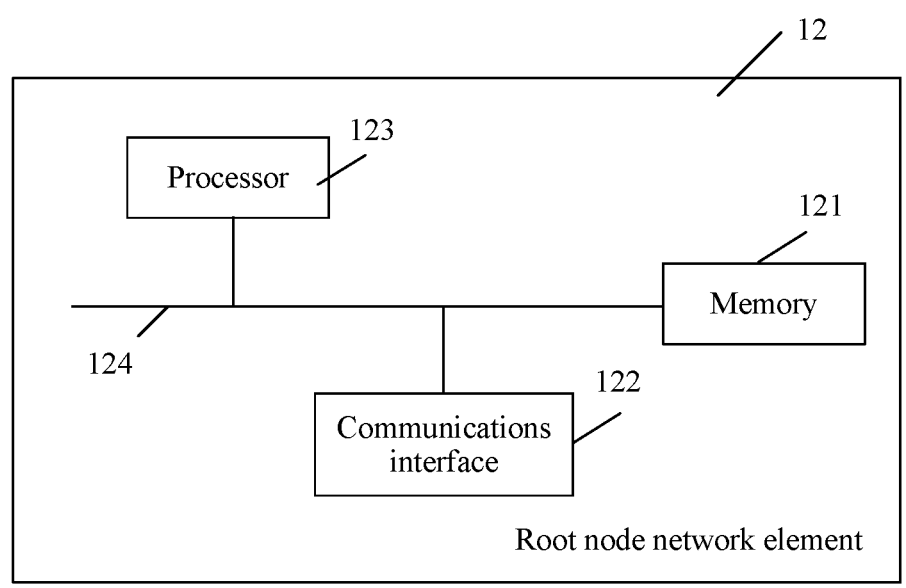
FIG. 12 is a schematic structural diagram of another root node network element according to an embodiment of the present application.

As shown in FIG. 12, FIG. 12 is a schematic structural diagram of a root node network element according to an embodiment of the present application. A root node network element 12 shown in FIG. 12 is configured to perform an action performed by the root node network element in any congestion control method provided above. The root node network element 12 may include a memory 121, a communications interface 122, a processor 123, and a system bus 124. The communications interface 122 and the processor 123 are connected by using the system bus 124.

The memory 121 is configured to store a computer executable instruction.

When the root node network element 12 runs, the processor 123 executes the computer executable instruction stored by the memory 121, so that the root node network element 12 performs the action of the root node network element in the method embodiments provided above. For the action performed by the root node network element, refer to the foregoing related description. Details are not described herein again.

In a an implementation process, operations in the foregoing method embodiments may be implemented in a manner in which the processor 123 in a hardware form executes the computer executable instruction in a software form that is stored in the memory 121. To avoid repetition, details are not described herein.

The memory 121 may include a volatile memory such as a RAM (random-access memory), or may include a non-volatile memory such as a ROM (read-only memory), a flash memory, an HDD (hard disk drive), or an SSD (solid-state drive), or may include a combination of at least two of the foregoing memories.

The communications interface 122 may be a transceiver. The transceiver may be a wireless transceiver. For example, the wireless transceiver may be an antenna or the like.

The processor 123 may be one processor, or may be a collective term for a plurality of processing elements. For example, the processor 123 may be a CPU (central processing unit, central processing unit), or may be another general purpose processor, a DSP (digital signal processor), an ASIC (application-specific integrated circuit), an FPGA (field-programmable gate array) or another programmable logic device, a discrete gate or a transistor logic device, a discrete hardware component, or the like. The general purpose processor may be a microprocessor. Alternatively, the processor 123 may be any conventional processor or the like, or may be a dedicated processor. The dedicated processor may include at least one of a baseband processing chip, a radio frequency processing chip, and the like.

The system bus 124 may include a data bus, a power bus, a control bus, a status signal bus, or the like. In this embodiment, for clarity of description, various buses are marked as the system bus 124.

This embodiment further provides a storage medium, and the storage medium may include the memory 121.

Because the root node network element 11 and the root node network element 12 provided in the embodiments of the present application are configured to implement the congestion control method provided above, for beneficial effects that can be achieved by the root node network element 11 and the root node network element 12, reference may be made to the foregoing description. Details are not described herein again.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

Finally, it should be noted that the foregoing embodiments are merely intended for describing the technical solutions of the present application but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A congestion control method, applied to a tree topology network, wherein the tree topology network comprises a root node network element, a first intermediate node network element, and a first leaf node network element, and the method comprises:

receiving, by the root node network element, a first link notification message sent by the first intermediate node network element, wherein the first link notification message carries link status information of a first link that is directly connected to a first port of the first intermediate node network element and an identifier of the first port, and the first link is configured to transmit traffic from the first intermediate node network element to the first leaf node network element through a second intermediate node network element connected to the first link, and the second intermediate node network element is connected to the first leaf node network element by a second link;

determining, by the root node network element based on the link status information of the first link in the first link notification message, that the first link is congested;

determining, by the root node network element, an identifier of the first leaf node network element based on a correspondence between the identifier of the first port and the identifier of the first leaf node network element, wherein, before the determining the identifier of the first leaf node network element based on the correspondence between the identifier of the first port and the identifier of the first leaf node network element, receiving, by the root node network element, a second link notification message sent by the second intermediate node network element, the second link notification message carrying link status information of the second link that is directly connected to a second port of the second intermediate node network element, and the second link being configured to transmit traffic from the second intermediate node network element to the first leaf node network element;

determining, by the root node network element, a service queue of the first leaf node network element based on a correspondence between the identifier of the first leaf node network element and an identifier of the service queue of the first leaf node network element, wherein the service queue of the first leaf node network element is a service queue transmitted by the root node network element to the first leaf node network element; and lowering, by the root node network element, an output bandwidth of the service queue of the first leaf node network element.

2. The method according to claim 1, wherein the link status information of the first link comprises at least one piece of the following information:

information that the first link is congested;

information that a packet loss exists on the first link;

information that a depth of a port queue of the first port is greater than or equal to a preset threshold, wherein the depth of the port queue refers to a difference between input traffic of the first port and output traffic of the first port; or a value of available bandwidth of the first link.

3. The method according to claim 1, wherein the tree topology network comprises a plurality of intermediate node network elements and a plurality of leaf node network elements, the plurality of intermediate node network elements comprise the first intermediate node network element, the plurality of leaf node network elements comprise the first leaf node network element, and before the determining, by the root node network element, an identifier of the first leaf node network element based on a correspondence between the identifier of the first port and the identifier of the first leaf node network element, the method further comprises:

generating, by the root node network element based on the tree topology, a correspondence table between an identifier of each port of one of the plurality of intermediate node network elements and an identifier of one of the plurality of leaf node network elements, wherein each port of the intermediate node network element is a port that is of the intermediate node network element and that is configured to transmit traffic to the leaf node network element; and obtaining, by the root node network element, the correspondence between the identifier of the first port and the identifier of the first leaf node network element based on the correspondence table.

4. The method according to claim 1, wherein the lowering, by the root node network element, output bandwidth of the service queue of the first leaf node network element comprises:

lowering, by the root node network element, the output bandwidth of the service queue of the first leaf node network element by a first preset step; and the method further comprises:

if the root node network element re-determines, within a preset time period after lowering the output bandwidth of the service queue of the first leaf node network element, that the first link is congested, continuing, by the root node network element, to lower the output bandwidth of the service queue of the first leaf node network element by the first preset step.

5. The method according to claim 1, wherein the lowering, by the root node network element, output bandwidth of the service queue of the first leaf node network element comprises:

lowering, by the root node network element, the output bandwidth of the service queue of the first leaf node network element by a first preset step; and the method further comprises:

if the root node network element determines, within a preset time period after lowering the output bandwidth of the service queue of the first leaf node network element, that the first link is uncongested, raising, by the root node network element, the output bandwidth of the service queue of the first leaf node network element by a second preset step, wherein the second preset step is less than the first preset step.

6. The method according to claim 1, wherein the method further comprises:

determining, by the root node network element based on the link status information of the second link in the second link notification message, that the second link is congested; and determining, by the root node network element, that a hop count between the first intermediate node network element and the root node network element is less than a hop count between the second intermediate node network element and the root node network element.

7. The method according to claim 6, wherein after the lowering, by the root node network element, output bandwidth of the service queue of the first leaf node network element, the method further comprises:

receiving, by the root node network element, a third link notification message sent by the second intermediate node network element, wherein the third link notification message carries link status information of the second link and an identifier of the second port;

determining, by the root node network element based on the link status information of the second link carried in the third link notification message, that the second link is congested;

determining, by the root node network element, the identifier of the first leaf node network element based on a correspondence between the identifier of the second port and the identifier of the first leaf node network element;

determining, by the root node network element, a service queue of the first leaf node network element based on a correspondence between the identifier of the first leaf node network element and an identifier of the service queue of the first leaf node network element; and lowering, by the root node network element, the output bandwidth of the service queue of the first leaf node network element.

8. A root node network element, applied to a tree topology network, wherein the tree topology network further comprises a first intermediate node network element and a first leaf node network element, and the root node network element comprises:

a non-transitory memory storing instructions; and a processor coupled to the non-transitory memory; wherein the instructions, when executed by the processor, cause the root node network element to be configured to:

receive a first link notification message sent by the first intermediate node network element, wherein the first link notification message carries link status information of a first link that is directly connected to a first port of the first intermediate node network element and an identifier of the first port, and the first link is configured to transmit traffic from the first intermediate node network element to the first leaf node network element through a second intermediate node network element connected to the first link, and the second intermediate node network element is connected to the first leaf node network element by a second link;

determine, based on the link status information of the first link in the first link notification message, that the first link is congested;

determine an identifier of the first leaf node network element based on a correspondence between the identifier of the first port and the identifier of the first leaf node network element, wherein, before the determining the identifier of the first leaf node network element based on the correspondence between the identifier of the first port and the identifier of the first leaf node network element, receiving, by the root node network element, a second link notification message sent by the second intermediate node network element, the second link notification message carrying link status information of the second link that is directly connected to a second port of the second intermediate node network element, and the second link being configured to transmit traffic from the second intermediate node network element to the first leaf node network element; and determine a service queue of the first leaf node network element based on a correspondence between the identifier of the first leaf node network element and an identifier of the service queue of the first leaf node network element, wherein the service queue of the first leaf node network element is a service queue transmitted by the root node network element to the first leaf node network element; and lower an output bandwidth of the service queue of the first leaf node network element.

9. The root node network element according to claim 8, wherein the link status information of the first link comprises at least one piece of the following information:

information that the first link is congested;

information that a packet loss exists on the first link;

information that a depth of a port queue of the first port is greater than or equal to a preset threshold, wherein the depth of the port queue refers to a difference between input traffic of the first port and output traffic of the first port; or a value of available bandwidth of the first link.

10. The root node network element according to claim 8, wherein the tree topology network comprises a plurality of intermediate node network elements and a plurality of leaf node network elements, the plurality of intermediate node network elements comprise the first intermediate node network element, and the plurality of leaf node network elements comprise the first leaf node network element, and the instructions, when executed by the processor, further cause the root node network element to be configured to:

generate, based on the tree topology, a correspondence table between an identifier of each port of one of the plurality of intermediate node network elements and an identifier of one of the plurality of leaf node network elements, wherein each port of the intermediate node network element is a port that is of the intermediate node network element and that is configured to transmit traffic to the leaf node network element; and obtain the correspondence between the identifier of the first port and the identifier of the first leaf node network element.

11. The root node network element according to claim 8, wherein the instructions, when executed by the processor, further cause the root node network element to be configured to:

lower the output bandwidth of the service queue of the first leaf node network element by a first preset step;

re-determine, within a preset time period after the root node network element lowers the output bandwidth of the service queue of the first leaf node network element, that the first link is congested; and continue to lower the output bandwidth of the service queue of the first leaf node network element by the first preset step.

12. The root node network element according to claim 8, wherein the instructions, when executed by the processor, further cause the root node network element to be configured to:

to lower the output bandwidth of the service queue of the first leaf node network element by a first preset step;

determine, within a preset time period after the root node network element lowers the output bandwidth of the service queue of the first leaf node network element, that the first link is uncongested; and raise the output bandwidth of the service queue of the first leaf node network element by a second preset step, wherein the second preset step is less than the first preset step.

13. The root node network element according to claim 8, wherein the instructions, when executed by the processor, further cause the root node network element to be configured to:

determine, based on the link status information of the second link in the second link notification message, that the second link is congested, and determine that a hop count between the first intermediate node network element and the root node network element is less than a hop count between the second intermediate node network element and the root node network element.

14. The root node network element according to claim 13, wherein the instructions, when executed by the processor, further cause the root node network element to be configured to:

receive a third link notification message sent by the second intermediate node network element, wherein the third link notification message carries link status information of the second link and an identifier of the second port;

determine, based on the link status information of the second link carried in the third link notification message, that the second link is congested; determine the identifier of the first leaf node network element based on a correspondence between the identifier of the second port and the identifier of the first leaf node network element; and determine a service queue of the first leaf node network element based on a correspondence between an identifier of the first leaf node network element and an identifier of the service queue of the first leaf node network element; and lower the output bandwidth of the service queue of the first leaf node network element.

* * * * *